Patented Oct. 9, 1934

1,976,359

UNITED STATES PATENT OFFICE 1,976,359

LIGHT FILTERING OVERCOATING

Thomas F. Murray, Jr., Rochester, N. Y., assignor to Eastman Kodak Company, Rochester, N. Y., a corporation of New York No Drawing. Application January 16, 1932, Serial No. 587,161

17 Claims. (Cl. 91—68)

This invention relates to protective coatings and to articles coated therewith. One of its objects is to provide a filter for the absorption of ultra-violet light. Another object is to provide a lacquer or overcoating which absorbs substantially all the ultra-violet light which would have a deleterious effect upon the underlying surface. Another object is to provide a cellulose acetate lacquer which, having been applied over a nitrocellulose lacquer, absorbs many of the light rays which have a decomposing effect upon nitrocellulose.

It is a well known fact that nitrocellulose lacquers lose their gloss with relatively great rapidity when exposed to the elements. The delustering and decomposition of nitrocellulose lacquer surfaces, while to some extent due to inclement weather conditions, is primarily due to the ultra-violet rays from the sun, which penetrate and decompose the surface layer.

While the addition of pigments and plasticizers to nitrocellulose compositions aids to a slight extent in rendering a nitrocellulose layer used as an outer coating less affected by the ultra-violet light, the protection they afford is not by any means complete. Even with a considerable amount of these constituents present in the lacquer, there is, nevertheless, upon the surface, a goodly proportion of cellulose nitrate directly exposed to the solar radiation. Moreover, it has been found that under such conditions the exposed cellulose nitrate will be decomposed by the ultra-violet light falling upon its surface.

It has previously been proposed to protect cellulose nitrate lacquers from ultra-violet light by overcoating them with cellulose acetate lacquers. Cellulose acetate of itself does not decompose appreciably under the influence of ultra-violet light. However, it will not fully protect an under layer of cellulose nitrate over which it may be coated, for the reason that it does not completely absorb those light rays which decompose the nitrate. When, however, small quantities of certain substances which themselves have the property of absorbing ultra-violet light are incorporated in cellulose acetate lacquer compositions, the coatings produced from these lacquers are very effective in protecting underlying nitrocellulose coatings from ultra-violet light.

I have discovered that cellulose acetate compositions which contain small percentages of certain compounds containing a plurality of benzene rings have the property of inhibiting the passage of ultra-violet light. These compounds are di-p-toluene sulfonimide, triphenyl guanidine, and triphenyl phosphite. They have all been described in the literature. When added to cellulose acetate lacquers in amounts of from approximately 2% to 5% or more based on the weight of the cellulose acetate, they effectively protect from ultra-violet light a nitrocellulose or other surface overcoated with the cellulose acetate lacquer.

It is not particularly material what type of vehicle holds the filter, as suitable varnishes, gums, waxes, shellacs, etc. are for some purposes as useful as cellulose acetate as vehicles in which to incorporate the filter. Nor should I be understood to restrict myself to cellulose acetate specifically as a cellulose derivative vehicle for a light-filtering overcoating. There are numerous other esters of cellulose, such as cellulose propionate, cellulose butyrate, cellulose acetate-propionate, cellulose acetate-benzoate, cellulose nitro-acetate, cellulose phospho-acetate, etc., many of which are useful as vehicles in which to incorporate the filter for use as an overcoating. In selecting the vehicle it must, of course, be borne in mind that only those substances are suitable which are themselves not as rapidly decomposed as the subcoating which they are used to protect.

My novel overcoating lacquers may be prepared in the following manner, although any method which uniformly disperses the light-filtering substance throughout the vehicle used may generally be employed. Cellulose acetate, for example, may be mixed with approximately 3% of its weight of di-p-toluene sulfonimide, or of triphenyl quanidine, or of triphenyl phosphite, with or without the addition of say up to 50% of a suitable plasticizer. This mixture may then be dissolved in a suitable solvent or solvent mixture, such as one made up of 15% ethyl acetate, 50% acetone, 20% ethyl lactate and 15% denatural alcohol, aproximately one gallon of this solvent being required for 20 ounces of cellulose acetate. This example is given merely to acquaint those skilled in the art with one manner of incorporating the filter, and I am not to be limited by the details or proportions of this example except as may be indicated by the appended claims.

The term overcoating, and the description of these overcoatings in connection with lacquers, are to be understood broadly rather than specifically, as it will be apparent that the value of my invention lies in the fact that by interposing, between the cellulose nitrate layer and the source of the ultra-violet rays, a vehicle containing the ultra-violet light filter, the nitrate underlayer will be protected from decomposition and deterioration. Thus, the cellulose acetate overcoating may consist of an already formed sheet containing the filter, which sheet is interposed between the cellulose nitrate sheet to be protected and the source of the ultra-violet light. Furthermore, in the case of laminated glass, for instance, the cellulose derivative reinforcement interposed between the glass laminations may consist of a cellulose nitrate interlayer on either side of which is coated, or otherwise imposed, a layer or coating of a vehicle such as cellulose acetate with which has been incorporated an ultra-violet light filter. Thus, even though the cellulose nitrate interlayer be covered on both sides with glass, it is first covered with a vehicle containing an ultra-violet light filter, so that the cellulose nitrate is protected from decomposition by the ultra-violet light which would otherwise penetrate the cellulose nitrate and decompose it. Thus, the term overcoating used in this specification and the appended claims is not to be confined to a mere lacquer top coat, but is to be construed broadly as any shielding layer containing an ultra-violet filter for preventing decomposition of cellulose nitrate by ultra-violet light, or for protecting any surface or substance from ultra-violet light.

What I claim as my invention and desire to be secured by Letters Patent of the United States is:

1. An article of manufacture having a closely adhering coating decomposable by sunlight, and a light filtering overcoating comprising an organic derivative of cellulose and a compound selected from the group consisting of di-p-toluene sulfonimide, triphenyl guanidine, and triphenyl phosphite.

2. An article of manufacture having a closely adhering coating decomposable by sunlight, and a light filtering overcoating comprising cellulose acetate and a compound selected from the group consisting of di-p-toluene sulfonimide, triphenyl guanidine, and triphenyl phosphite.

3. An article of manufacture having a closely adhering coating decomposable by sunlight, and a light filtering overcoating comprising an organic derivative of cellulose and di-p-toluene sulfonimide.

4. An article of manufacture having a closely adhering coating decomposable by sunlight, and a light filtering overcoating comprising an organic derivative of cellulose and triphenyl guanidine.

5. An article of manufacture having a closely adhering coating decomposable by sunlight, and a light filtering overcoating comprising an organic derivative of cellulose and triphenyl phosphite.

6. An article of manufacture having a closely adhering coating decomposable by sunlight, and a light filtering overcoating comprising cellulose acetate and di-p-toluene sulfonimide.

7. An article of manufacture having a closely adhering coating decomposable by sunlight, and a light filtering overcoating comprising cellulose acetate and triphenyl guanidine.

8. An article of manufacture having a closely adhering coating decomposable by sunlight, and a light filtering overcoating comprising cellulose acetate and triphenyl phosphite.

9. An article of manufacture having a closely adhering coating decomposable by sunlight, and a light filtering overcoating which comprises cellulose acetate, a plasticizer, and a compound selected from the group consisting of di-p-toluene sulfonimide, triphenyl guanidine and triphenyl phosphite.

10. An article of manufacture having a light filtering protective covering comprising a cellulose acetate overcoating superimposed upon a cellulose nitrate coating, the overcoating, due to its content of a compound selected from the group consisting of di-p-toluene sulfonimide, triphenyl guanidine, and triphenyl phosphite, having the characteristic that it absorbs substantially all the ultra-violet that reaches the earth's surface from the sun, and thereby protects the cellulose nitrate coating from decomposition.

11. An article of manufacture having a cellulose nitrate coating with an overcoating of cellulose acetate containing a compound selected from the group consisting of di-p-toluene sulfonimide, triphenyl guanidine and triphenyl phosphite.

12. An article of manufacture having a cellulose nitrate coating with an overcoating of cellulose acetate containing di-p-toluene sulfonimide.

13. An article of manufacture having a cellulose nitrate coating with an overcoating of cellulose acetate containing triphenyl guanidine.

14. An article of manufacture having a cellulose nitrate coating with an overcoating of cellulose acetate containing triphenyl phosphite.

15. An article of manufacture having a cellulose nitrate coating with an overcoating of cellulose acetate containing from approximately 2% to 5%, based on the weight of the cellulose acetate, of a compound selected from the group consisting of di-p-toluene sulfonimide, triphenyl guanidine and triphenyl phosphite.

16. A composition of matter comprising a cellulose organic ester and triphenyl guanidine.

17. A composition of matter comprising a cellulose organic ester and triphenyl phosphite.

THOMAS F. MURRAY, Jr.